Nov. 21, 1967     Z. TARCZY-HORNOCH     3,353,439
APPARATUS FOR MEASURING THE VELOCITY OF LIGHT
Filed May 9, 1963     3 Sheets-Sheet 2
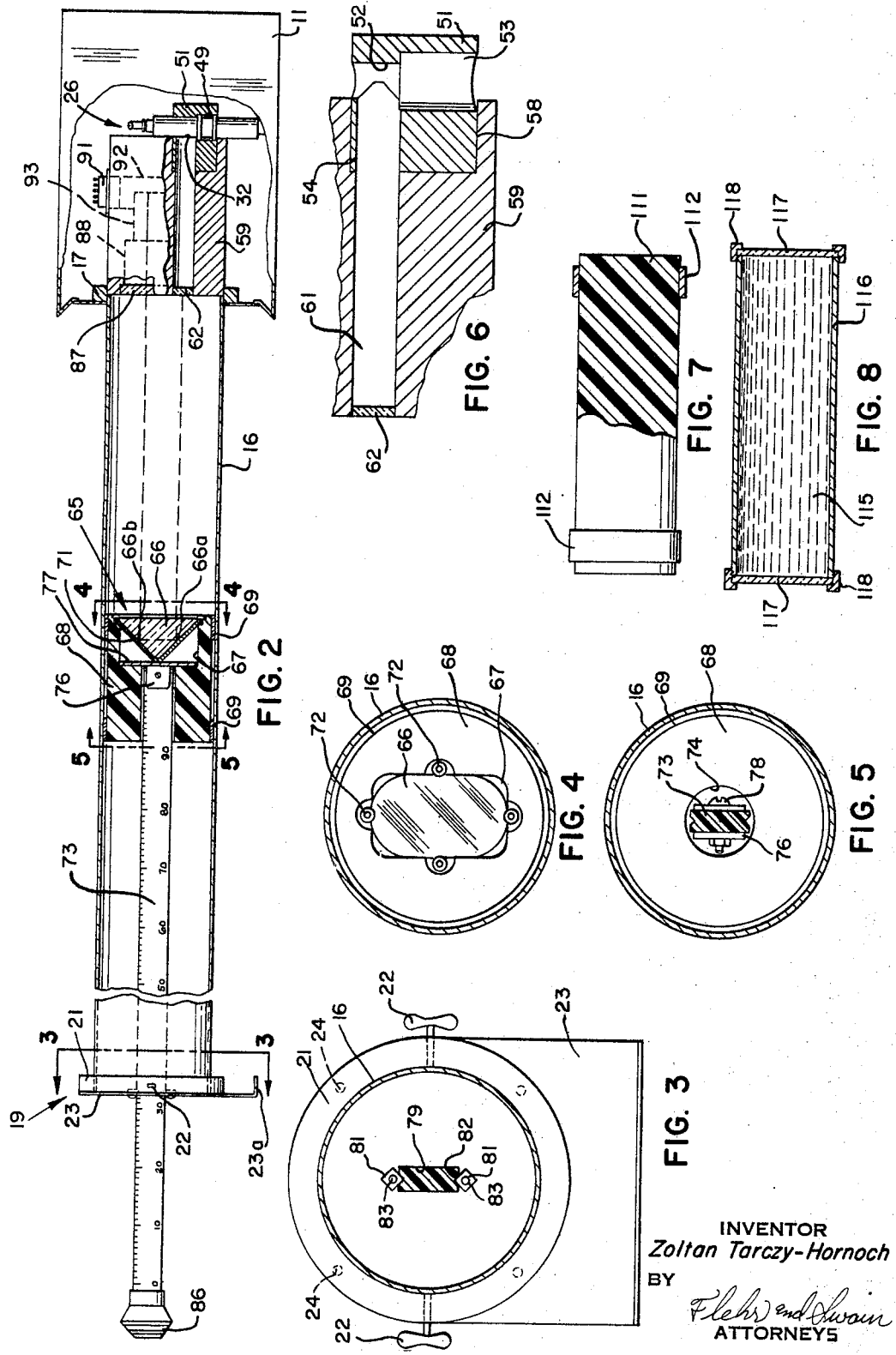
INVENTOR
*Zoltan Tarczy-Hornoch*
BY
*Flehr and Swain*
ATTORNEYS INVENTOR
Zoltan Tarczy-Hornoch
BY
Flehr and Swain
ATTORNEYS United States Patent Office 3,353,439
Patented Nov. 21, 1967

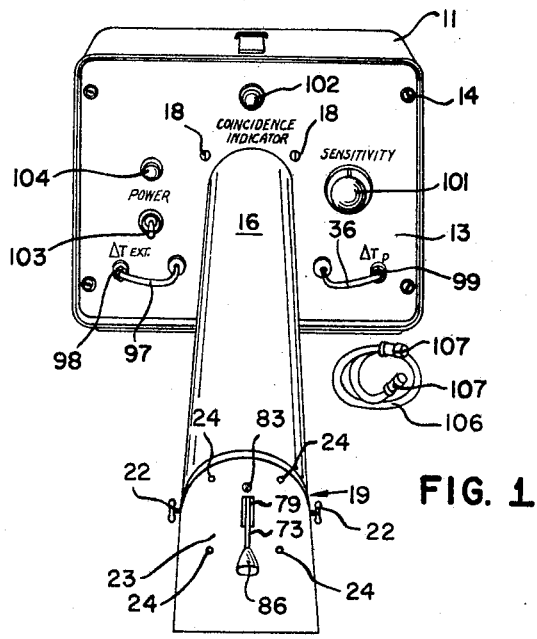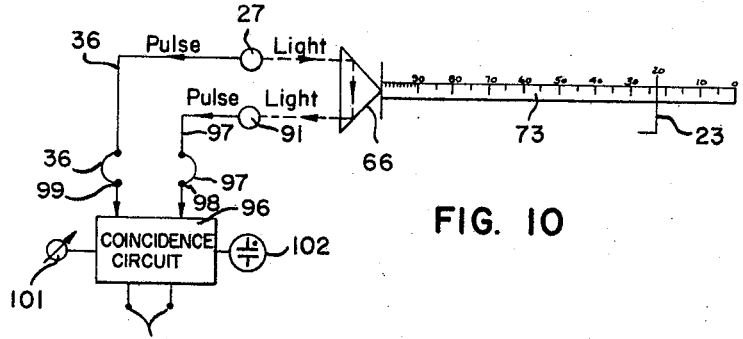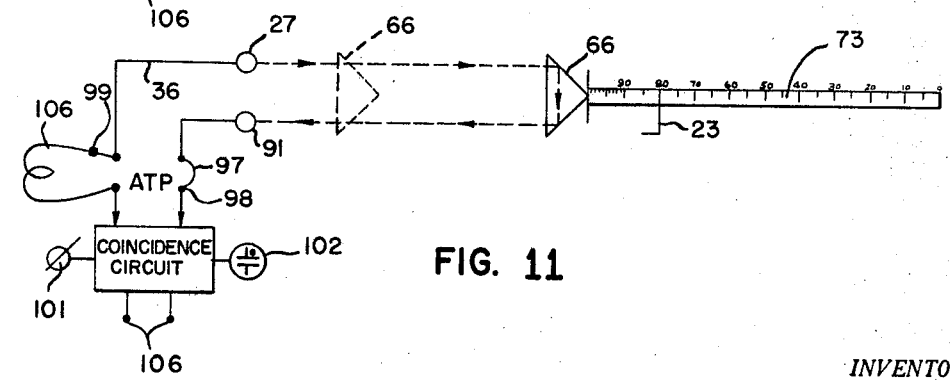

3,353,439
APPARATUS FOR MEASURING THE
VELOCITY OF LIGHT
Zoltan Tarczy-Hornoch, Berkeley, Calif., assignor to
W. K. Rosenberry, doing business as Able Research
Lab., Berkeley, Calif.
Filed May 9, 1963, Ser. No. 279,112
3 Claims. (Cl. 88—1)

This invention relates to an apparatus and method for measuring the velocity of light.

Apparatus has heretofore been available for measuring the velocity of light. However, as is well known to those skilled in the art, such apparatus has been expensive and is very bulky and cumbersome to use. There is, therefore, a need for a new and improved method and apparatus for measuring the velocity of light.

In general, it is an object of the present invention to provide a relatively simple method and apparatus for measuring the velocity of light.

Another object of the invention is to provide a method and apparatus of the above character in which the velocity of light can be determined by merely measuring distance and utilizing a calibrated time standard.

Another object of the invention is to provide a method and apparatus of the above character in which distance and time can be readily measured.

Another object of the invention is to provide a method and apparatus of the above character which is relatively accurate.

Another object of the invention is to provide a method and apparatus of the above character which is unaffected by ambient light conditions.

Another object of the invention is to provide a method and apparatus of the above character which can measure the velocity of light in different gases, liquids and solids.

Another object of the invention is to provide a method and apparatus of the above character which can be utilized in the laboratory and which can be utilized for classroom demonstration.

Another object of the invention is to provide a method and apparatus of the above character which can be performed and used by relatively unskilled personnel.

Another object of the invention is to provide apparatus of the above character which is relatively simple and economical to construct.

Another object of the invention is to provide apparatus of the above character which is small and completely self-contained and can be easily carried by one person, and placed on a work bench and turned on for operation without requiring any set-up time.

Another object of the invention is to provide apparatus of the above character which, in addition, can be used for high resolution coincidence, delayed coincidence, time analysis, time interval and time delay measurements.

Another object of the invention is to provide apparatus of the above character which can be utilized as a pulse generator, a light pulse generator, a time delay generator or a calibrated time standard.

Additional objects and features of the invention will appear from the following description in which the preferred embodiments are set forth in detail in conjunction with the accompanying drawings.

Referring to the drawings:

FIGURE 1 is a perspective view of apparatus incorporating my invention looking from the front and above.

FIGURE 2 is a side elevational view with certain parts broken away of the apparatus shown in FIGURE 1.

FIGURE 3 is a cross-sectional view taken along the line 3—3 of FIGURE 2.

FIGURE 4 is a cross-sectional view taken along the line 4—4 of FIGURE 2.

FIGURE 5 is a cross-sectional view taken along the line 5—5 of FIGURE 2.

FIGURE 6 is an enlarged detail view of a portion of the apparatus shown in FIGURE 2 with the capsule assembly removed.

FIGURE 7 is a side elevational view with certain parts broken away showing a cylinder of a suitable transparent material such as Lucite which can be used in my apparatus for measuring the velocity of light in a solid.

FIGURE 8 is a cross-sectional view of another cylinder adapted to contain a suitable fluid such as water which also can be utilized in my apparatus for measuring the velocity of light in a fluid.

FIGURE 9 is an enlarged detail view in cross-section of a capsule assembly utilized for producing coincident light and electrical pulses.

FIGURES 10 and 11 are circuit diagrams with certain of the parts schematically illustrated showing my method for measuring the velocity of light.

Figure 12:
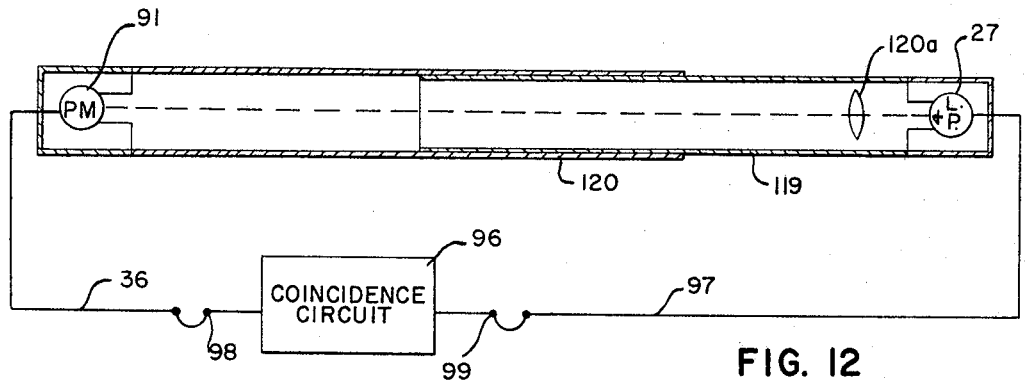
FIGURES 12–15 are circuit diagrams with certain parts schematically illustrated of additional embodiments of my apparatus for measuring the velocity of light.

In general, my method for measuring the velocity of light consists of generating repetitively light and electrical pulses in which the light and electrical pulses have a known time relationship to each other. The light and electrical pulses are received at points spaced from the point at which the light and electrical pulses are generated. One parameter is adjusted while holding the other parameter constant so that the light pulses and the electrical pulses are received in an identifiable time relationship. One of the parameters is the length of the light path and the other parameter is the time delay between the time the electrical pulses are generated and the time at which they are received. Then, a known change is made in the other parameter. Said one parameter is then readjusted so that the light and electrical pulses are again received in said identifiable time relationship. The velocity of light is then calculated utilizing said known change for said other parameter and the difference between the first and second adjustments for the one parameter.

My apparatus for measuring the velocity of light is shown in FIGURES 1–9 of the drawings and consists of a rectangular case 11. A front panel 13 is removably mounted on the case 11 by suitable means such as screws 14. An elongate cylindrical member or tube 16 formed of a suitable material such as aluminum is mounted on the front panel 13 in a centrally disposed position and so that it extends outwardly perpendicular to the front panel. Means is provided for mounting tube 16 on the front panel and consists of a ring 17 of suitable material such as aluminum which is affixed to the rear end of the tube 16 by suitable means such as a cement. The ring 17 is secured to the front panel by suitable means such as screws 18. An outer tube support assembly 19 is removably secured to the outer end of the tube 16 and consists of a ring 21 which fits over the outer end of the tube 16 and is releasably secured thereto by suitable means such as thumb screws 22. A plate 23 is secured to the ring 21 by suitable means such as screws 24. The plate is provided with an in-turned foot-like portion 23a which is adapted to rest upon the same surface on which the case 11 rests so that the tube 16 will be supported in a substantially horizontal position.

Means is provided within the case 11 for generating repetitive coincident light and electrical pulses and consists of a capsule assembly 26 which is shown in detail in FIGURE 9. A light and pulse source 27 forms a part of the capsule assembly and preferably is a type which generates a very bright light for a short period of time and a relatively narrow pulse of high amplitude. One source which I have found to be particularly satisfactory consists of a mercury switch which generates nanosecond ($10^{-9}$ sec.) light pulses and electrical pulses. The mercury switch can be of any suitable type such as Clare HG X1003 which is provided with a moving reed 28 that is adapted to make contact with a stationary contact element 29 to provide a normally open switch. The mercury switch 28 is supported within a small metal tube 31 of a suitable material such as copper and in such a position that the point of contact between the moving reed 28 and the stationary contact 29 is in alignment with the tube 31. Washers 32 of a suitable conducting material such as copper are mounted in the ends of the tube 31.

An attenuating network 33 consisting of a plurality of interconnected resistors 34 are connected to the stationary contact 29 of the mercury switch and to the grounded washer 32 and a delay line 36 as shown particularly in FIGURE 9. The delay line 36 is connected to the attenuating network through a feedthrough connector 37 mounted on the washer 32. The movable reed 28 of the mercury switch is connected to a charging network 39 which consists of a plurality of resistors 41, a plurality of capacitors 42 and decoupling ferrite beads 43. The upper end of this charging network is connected to the movable reed 28 of the mercury switch as shown particularly in FIGURE 9. The other end of the charging network is connected to a suitable high voltage supply (not shown), such as 1000 volts DC through a coaxial line 46 which is provided with grounded shielding 47. The coaxial line is connected to the charging network through a feedthrough connector 48 which is mounted on the washer 32. The charging network is also connected to the grounded washer 32 as shown in FIGURE 9. An open-ended tube 50 of suitable material such as plastic is disposed within the tube 31 and extends upwardly from the charging circuitry.

The tube 50 which is formed of an insulating material, the tube 31 of conducting material and the coaxially aligned moving reed 29 of the mercury switch 27 with the associated charging circuitry 42 provide a coaxial charging line having substantially constant impedance which is internally disposed within the capsule assembly 26 to thereby eliminate the need for an external charging line. The rate at which light and electrical pulses are produced by the source 27 is determined by the number of times the moving reed 28 repeatedly engages the stationary contact 29. This rate is determined by the frequency at which the electromagnet 49 is energized. Thus, as shown in the drawing, when the electromagnet 49 is connected to a 60 cycle A-C supply, the electromagnet will be energized sixty times each second to cause the normally open switch 27 to close sixty times in each second.

During operation of the capsule assembly, the charging line which is formed by the reed 28, the dielectric 51 and the tube 31 are continuously charged by the high voltage D-C supply connected to the coaxial line 46. The time required for charging this line is very short because the capacitance provided by the reed 28 is very small. In particular, the time required for charging the charge line is much less than the period of time between closures of the switch 27 at its 60 cycle per second rate. Each time the switch 27 is closed, a small, bright, very sharp and very narrow spark is created as the charge line discharges through the switch into the attenuating network 33. Simultaneously or substantially simultaneously, a very narrow electrical pulse is generated which is, for example, less than one-half of a nanosecond in width, a rise time of less than one-fourth of a nanosecond and an amplitude of approximately 300 volts. At the same time, a bright and very narrow light pulse is generated. It is readily apparent that, if desired, other light and pulse sources can be utilized. The only requirement is that the light and electrical pulses generated be substantially coincident or be separated by a substantially constant time delay. In other words, they must be related timewise in a substantially constant manner.

The capsule assembly 26 is mounted in a cylindrical capsule holder 51 formed of a suitable opaque shock-resistant material such as polyurethane foam. The capsule holder is provided with a generally vertically extending bore 52 which opens into a cyindrical bore 53 of a substantially larger diameter. The capsule holder is also provided with a horizontal cylindrical bore 54 which extends in a direction at right angles to the bore 52 and opens into the bore 52.

The capsule assembly 26 is adapted to be positioned in the bore 52 so that the opening 32 faces the bore 54 so that light from the source 27 will pass axially down the bore 54. After the capsule assembly 26 has been properly adjusted as hereinafter described within the bore 52, the capsule assembly is fixedly secured within the capsule holder 51 by suitable means such as a plastic cement. Similarly, the electromagnet 49 which forms a part of the capsule assembly is secured within the bore 53 by suitable means such as cement.

The capsule holder 51 is mounted in a bore 58 provided in a large substantially cylindrical block 59 formed of a suitable opaque shock-resistant material such as polyurethane foam. This cylindrical block is secured in the ring 17 by suitable means such as cement and abuts the inner end of the tube 16 as shown in FIGURE 2. The block 59 is provided with a horizontal bore 61 which is in general alignment with the bore 54 provided in the capsule holder 51. A condensing lens 62 is mounted in the block 59 on the outer end of the bore 61 and is adapted to condense the light which is received from the capsule holder 51 so that the light rays from the light source 56 will extend axially or longitudinally of the tube 16. The capsule assembly 26 can be adjusted so that the source 27 is at the focal point of the lens 62. Vertical adjustment of the source 27 is obtained by shifting the capsule assembly 26 vertically in the bore 52. Horizontal adjustment can be obtained by rotating the capsule holder 51 within the bore 58. Any vertical movement of the source 27 because of rotation of the capsule holder 51 can be compensated for by shifting the vertical position of the capsule assembly 26 within the capsule holder 51. Proper focusing can be accomplished by shifting the plug 51 horizontally within the bore 58. After the source 27 within the capsule assembly has been properly positioned, the various parts can be cemented in place.

Means is provided within the light-tight tube 16 for reflecting the light rays and comprises a prism assembly 65. The prism assembly consists of a prism 66 which is mounted within the recess 67 in a cylindrical plug 68 of suitable opaque shock-resistant material such as polyurethane foam. Bands 69 of suitable material such as a pressure sensitive tape are wound around the opposite ends of the plug 68 so that light-tight seals are formed between the plug 68 and the tube 16. The prism 66 is mounted in a holder 71 disposed within the recess 67 and is held in the recess by suitable means such as screws 72.

Means is provided for shifting the block 68 and the prism 66 carried thereby longitudinally of the tube 16 and consists of a bar 73 which extends through a horizontal bore provided in the plug 68. The bar is mounted between ears 76 formed on a plate 77 which is secured within the recess 67 by suitable means such as cement. The bar 73 is pivotally mounted between the ears 76 by suitable means such as a bolt 78. The bar 73 is formed of suitable material such as plastic and is calibrated with a suitable scale such as the centimeter scale shown in FIGURE 2 of the drawings for a purpose hereinafter described. The bar 73 is slidably mounted in a rectangular opening 79 provided in the plate 23 and is guided by a pair of rectangular members 81 which extend into substantially V-shaped recesses 82 formed in the upper and lower sides of the bar 73 and extending longitudinally thereof. The members 81 are secured to the front plate 23 by suitable means such as screws 83. The bar 73 is provided with a handle 86 to facilitate movement of the bar and the prism assembly 65 longitudinally of the tube 16.

From the foregoing description, it can be seen that the space within the tube between the prism 66 and the light source within the capsule assembly 26 is completely light-tight. The inner surface of the tube 16 is anodized black to minimize any reflections within the tube.

The prism 66 is a right-angle prism and is provided with two surfaces 66a and 66b which subtend an angle of 90° and which form an angle of 45° with respect to the longitudinal axis of the tube 16. It is readily apparent that, if desired, a pair of mirrors can be used in place of the prism 66 in which the two mirrors are positioned so that the surfaces are in the same position as the surfaces 66a and 66b of the prism 66.

As shown in FIGURE 2, the prism 66 reflects the light rays or light beam in a path which is parallel to the direction in which the light beam or rays are received from the light source and causes them to pass through a condensing lens 87 mounted in a bore 88 formed in the block 59. It will be noted that the condensing lens 87 is substantially larger than the condensing lens 62. Because of imperfections in the lenses themselves and also because the light source is not precisely a point source, there will be some divergence of the light rays. The first condenser lens 62 serves as means for ensuring that the light rays from the light source travel in as parallel a path as possible without any substantial convergence or divergence. However, even if there is some divergence or convergence of the light rays or beams, the condensing lens 87 which has a relatively large diameter ensures that substantially all the light will be collected and concentrated on suitable photosensitive means such as a photomultiplier tube 91 mounted in a vertical bore 92 provided in the block 59.

The tube 91 extends downwardly into another bore 93 which opens into the bore 88 so that light concentrated by the lens 87 will be received by the photomultiplier tube 91. The photomultiplier tube 91 can be properly positioned in the bore 88 and then also cemented in place. The photomultiplier tube 91, as is well known to those skilled in the art, generates an electrical pulse in proportion to the intensity of the light pulse which is received. This electrical pulse is supplied to a coincidence circuit 96 by suitable means such as a coaxial line 97. A readily accessible external connector 98 has been provided so that the line 97 can be opened. This external connector is labelled $\Delta T_{EXT}$. Similarly, the line 36 is provided with a readily accessible external connector 99 labelled $\Delta T_P$ so that the line 36 connected to the coincidence circuit 96 can also be opened.

The coincidence circuitry 96 is of a type well known to those skilled in the art and merely discriminates between coincident and non-coincident pulses having the same general pulse amplitude. For this reason, the coincidence circuitry will not be described in detail. However, as is well known to those skilled in the art, such coincidence circuitry may include a sensitivity control 101 and a coincidence indicator such as a lamp 102.

The power supplies for the various parts of the apparatus have been omitted because these can be substantially conventional. A power switch 103 and a power on light 104 are provided on the front panel 13 for the sake of convenience. The coincidence discriminator or circuitry 96 has been provided with an additional output 106 which can be utilized for giving an audio indication of coincidence if this is desired.

A coaxial line 36 is provided to give a small built-in delay so that both the electrical pulse which is supplied by the source 27 and the electrical pulse from the photomultiplier 91 arrive at the coincidence detector 96 at approximately the same time.

The apparatus also includes a separate delay cable 106 which is provided with male and female connectors 107 so that it can be connected into the circuitry as hereinafter described.

Operation of my apparatus in performing my method for measuring the velocity of light may now be briefly described as follows. Let it be assumed that the delay cable 106 is removed from the circuit. The rod or bar 73 is then pushed inwardly until, for example, the 20 cm. indication on the rod is in line with the plate 23 as shown in FIGURE 10. The sensitivity control knob 101 is then turned clockwise until the concidence light 102 begins to flash.

Whenever the coincidence light 102 flashes, it indicates that $T_{pulse}$ equals $T_{light}$, that is, the time required for the electrical pulse to travel from the source 27 to the coincidence circuitry 96 is substantially identical to the time required for the light to travel from the source 27 to the photosensitive means 91 to be transformed into a pulse and for the pulse to arrive at the coincidence circuitry.

After the knob has been adjusted so that the coincidence light begins to flash, the rod or bar 73 is then moved in and out by grasping of the handle 86 and by noting roughly the range over which the coincidence light flashes. Normally, it is desirable to obtain a suitable range. Too much sensitivity makes the coincidence range wide and the interpolation to the center point less accurate, whereas too low a sensitivity with a narrow coincidence range is more susceptible to noise. Normally, the best sensitivity level is that which gives the most reproducible coincidence range. With one embodiment of the apparatus I have constructed, I have found that the 10 cm. range is such a range. If this is not obtained, the sensitivity control should be adjusted until this approximate range is obtained.

After this has been accomplished, the rod 73 is pushed into the light tube 16 until the light 102 stays out. The rod is then slowly pulled out until the light just begins to flash. A reading is then made on the scale on the bar 73 at the plate 23 and this is recorded as L1 which, for example, may be 20 cm. as shown in FIGURE 5. The rod 73 is then pulled out until the coincidence light 102 stays out. The rod is then slowly pushed in until the coincidence light 102 just begins to flash. The scale is then read at the plate 23 and this setting is identified as L2. By way of example, this could be 30 cm. The exact point of coincidence can be obtained by averaging the two scale readings with the formula $$\frac{L1+L2}{2} = L_a$$

Inserting the above values in this equation, we obtain $$\frac{20+30}{2} = 25$$

Next, the cable 36 is disconnected at $\Delta T_P$ by opening the connector 98 and the delay cable 106 is inserted by connecting one end of the cable 36 to the delay cable and connecting the other end of the delay cable to the $\Delta T_P$ terminal. This cable 106 is a cable which has a predetermined time delay. For example, this delay line can increase the delay of the pulse by a known $\Delta T_P$ as, for example, 4.00±0.02 nanoseconds.

The exact point of coincidence is determined in a manner similar to that hereinbefore described. First, the rod 73 is pulled until it is practically all out of the light tube 16 as, for example, at the 80 cm. setting. The sensitivity control 101 is adjusted to produce a range of approximately 10 cm. The innermost and outermost settings of the rod at which the coincidence light just begins to flash are noted and the new exact point of coincidence caused by inserting the delay $\Delta T_P$ by means of the delay line 106 is determined by averaging the new limits of coincidence L3 and L4 in the following formula $$\frac{L3+L4}{2}=L_b$$

as, for example, $$\frac{80+90}{2}=85$$

The difference between $L_b$ and $L_a$ is the distance $\Delta L$ that the prism 66 had to travel to restore coincidence after insertion of the time delay $\Delta T_P$. The light, in travelling to the right angle prism 66 and back, covers an extra distance of $2\Delta L$. Therefore, $$c=\frac{2\Delta L}{\Delta T_P}=\frac{2\times 60 \text{ cm.}}{4\times 10^{-9} \text{ sec.}}=3.00\times 10^{+10} \text{ cm./sec.}$$

to give the velocity of light in air.

Repeated measurements using the same experimental procedure may be averaged to reduce the random experimental errors.

From the foregoing, it can be seen that it is not necessary to know the exact position of the prism 66 within the light tube 16. It is merely necessary to know the change in distance between the two points of exact coincidence to determine the velocity of light.

I have found that this method of measuring the speed of light is inherently very accurate in that the accuracy obtainable depends primarily upon the proper adjustment of the coincidence sensitivity and the accuracy of the delay lines used. Typically, I have found that 1-3% accuracy can be obtained without prior experience in utilizing the apparatus which makes it ideal for classroom instruction and student experimentation. However, under laboratory conditions with careful control, I have found that it is possible to obtain measurements with better than 0.1% accuracy.

In addition to measuring the speed of light in air, it is possible to measure the velocity of light in other media such as liquids and solids which are transparent or substantially transparent. For example, let it be assumed that it is desired to measure the speed of light in a plastic such as Lucite. As shown in FIGURE 7, a cylinder 111 formed of this material is used which is adapted to fit within the light tube 16. Bands 112 are provided on opposite ends of this cylinder 111 to provide light-tight seals between the cylinder 111 and the inner wall of the light tube 16.

With the delay cable 106 in place, the limits of coincidence L3 and L4 are obtained in a manner hereinbefore described and the position of exact coincidence $L_b$ is calculated as hereinbefore described. The wing screws 22 holding the ring 21 and the retainer plate 23 in place are turned to release the ring 21 from the tube 16. The bar 73 and the prism assembly 65 are then removed with the ring 21 and plate 23 from the light tube 16. After the length of the cylinder 111 has been accurately measured, the cylinder is placed within the light tube 16 so that it is relatively close to the block 59. The calibrated rod and the prism assembly are then re-installed in the light tube 16. The new limits of coincidence L5 and L6 are then determined in a manner similar to that hereinbefore described and the new position of exact coincidence $L_c$ is determined from the formula $$\frac{L5+L6}{2}=L_c$$

Then $L_b-L_c$ is the distance $\Delta L_p$ that the prism 66 must be moved to compensate the light path for the extra time spent in the cylinder 111 with length $L_p$. Therefore, the speed of light in air $c$ is to the speed of light in the cylinder $V_p$ as the $L_p+\Delta L_p$ is to $L_p$ alone. Or, $$\frac{c}{V_p}=\frac{L_p+\Delta L_p}{L_p}$$

Or, $$V_p=\frac{cL_p}{L_p+\Delta L_p}$$

From the foregoing, it can be seen that the speed of light in a solid can be readily ascertained with my apparatus. It is merely necessary to form a cylinder of the solid so that it can be inserted in the light tube 16.

My apparatus can also be used for determining the speed of light in a fluid such as a gas or liquid by placing the gas or liquid in a hollow cylinder 116 and sealing the same with glass windows 117 on opposite ends held in place by rings 118 threaded onto the ends of the cylinder. Thus, as shown in FIGURE 8, this cylinder 116 has been filled with water 115.

The velocity of light in the medium contained within the cylinder 116 is obtained in the same manner as it was obtained with the solid with the exception that $L_3$, $L_4$ and $L_b$ are determined with the empty hollow cylinder 116 in place. This is done to eliminate the effect of the material in the two ends of the hollow cylinders, that is, the material used for the windows 117. The length $L_p$ is the inside dimension of the hollow cylinder in this case. The cylinder is then withdrawn, filled with the desired liquid and then replaced in the light tube 16, after which $L_5$, $L_6$ and $L_c$ are determined.

In a similar manner, the velocity of light in solutions of differing concentrations can be determined.

From the foregoing, it should be apparent that if the material is unknown, the speed of light measurement can be utilized to identify the material. By checking appropriate tables, the speed of light should facilitate identification of the material. The apparatus can also be utilized for establishing the relationship between the index of refraction and the velocity of light in the substance.

Although I have described my apparatus primarily for measuring the velocity of light, it can also be used for measuring time delays. For example, knowing the speed of light in air, the apparatus can be utilized to measure the time delay in an unknown length of cable. The delay time $\Delta T_p$ is obtained from the known speed of light using the formula $$\Delta T_p=2\Delta L/c$$

The apparatus can also be utilized for making time analyses, time interval generation, coincidence and delayed coincidence measurements, etc., in the zero to 100 nanosecond range using additional calibrated cables. Also, the apparatus can be utilized as a nanosecond pulse generator or a light pulse source. The delay cables can also be utilized as calibrated time standards.

Although I have disclosed apparatus in which the bar 73 is positioned manually to obtain coincidence, means can be provided for automatic positioning of the bar to obtain coincidence and the measurements at coincidence determined automatically and fed into a relatively simple computer to determine the velocity of light.

Although in FIGURES 1-6 I have shown an embodiment of my apparatus in which the light beam is reflected by a prism so that it travels through the tube twice to therefore make possible a more compact apparatus, it is feasible to utilize the same principles in other types of apparatus in which the light beam is not reflected. Such an arrangement is shown in FIGURE 12 in which two tubes 119 and 120 which telescope with respect to each other are provided. With the light and pulse source 27 mounted in one of the tubes 119 and 120 and the photosensitive means 91 mounted in the other of the tubes, no reflection of the light beam is required. A lens 120a is mounted in the tube 117 for condensing the light from the light and pulse source 27. The measurements would be carried out in substantially the same manner as hereinbefore described. The primary difference is that the apparatus shown in FIGURE 12 would be approximately twice as long as that shown in FIGURES 1–6.

Figure 13:
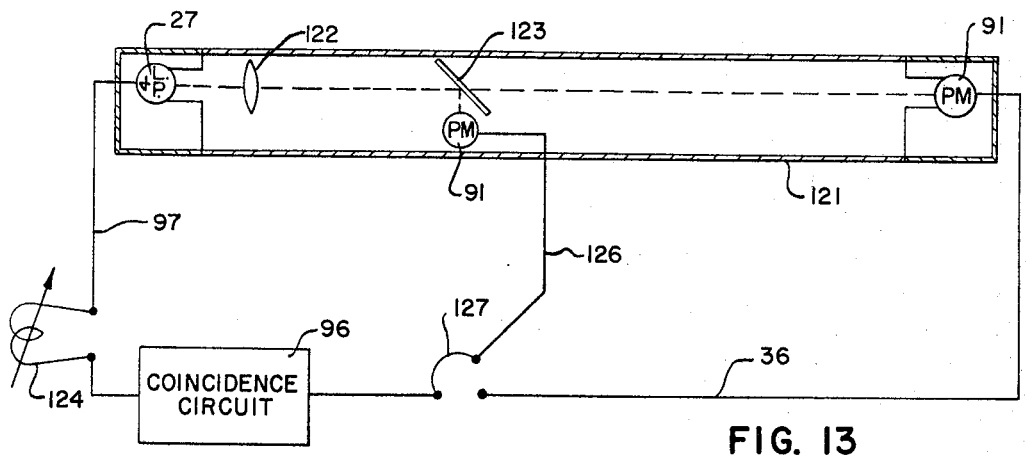

In FIGURE 13, there is shown still another embodiment in which a single tube 121 is utilized. The light and pulse source 27 is mounted on one end of the tube and the photosensitive means is mounted in the other end of the tube. A lens 122 is provided within the tube for condensing the light from the light and pulse source 27 onto a semireflecting mirror 123 which passes some of the light to the photosensitive means 91 at the end of the tube and reflects some of the light downwardly to the photosensitive means 91 between the end of the tube. A calibrated variable delay line 124 of a suitable type such as a microwave trombone manufactured by General Radio is placed in the line 97. The output of the photosensitive means 91 between the end of the tube 121 is adapted to be connected to the coincidence circuit 96 by a connector 127.

In using this apparatus to measure the velocity of light, the delay line 124 is adjusted. The exact point of coincidence is obtained. A reading is then made on the scale provided on the delay line 124 and this is used as $T_a$. The connector 127 is then shifted so that it is connected to the line 36 and the delay line 124 is again adjusted until coincidence is obtained. A reading is then made on the variable delay line 24 and this is used as $T_b$. The difference between $T_a$ and $T_b$ gives the $\Delta T$ time delay. This is compared with the known distance $\Delta L$ which is the distance between the two photosensitive means 91 in the formula $$c = \Delta L / \Delta T$$

assuming that the time delays in cables 126 and 36 are equal.

Although this is a relatively simple approach, this apparatus has a disadvantage in that the photosensitive means or the photomultipliers 91 do not necessarily have the same delay times and they can drift individually so that measurements made with such apparatus will normally not be as accurate as those made with the apparatus shown in FIGURES 1–6.

Figure 14:
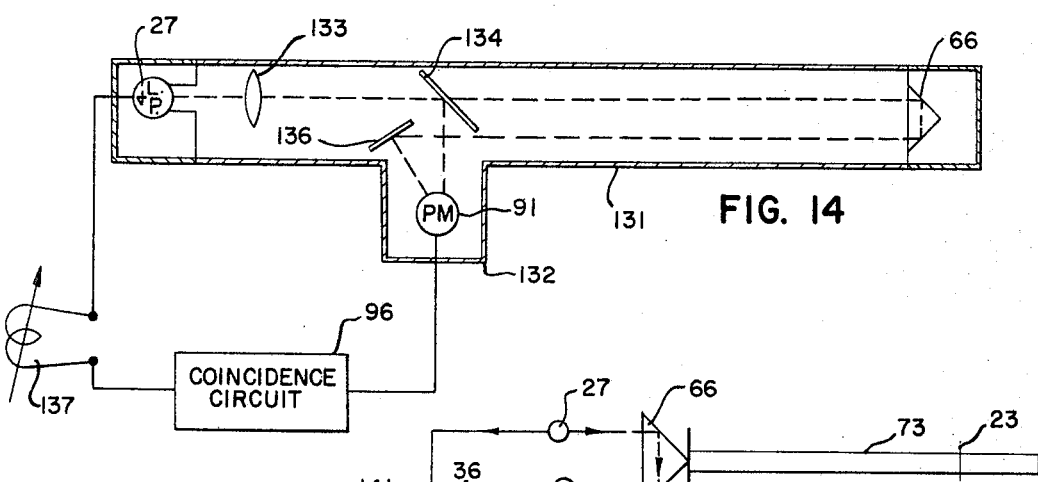

Still another embodiment of my apparatus is shown in FIGURE 14 which utilizes a tube 131 which is provided with a protrusion 132 which carries the photomultiplier 91. The light and pulse source 27 is provided at one end of the tube 131, whereas a right angle prism 66 is carried by the other end of the tube. The light from the light and pulse source 27 passes through a condensing lens 133 and through a semi-reflecting mirror 134 to the prism 66 where it is returned and reflected by a mirror 136 to the photomultiplier 91. Light is also received by the photomultiplier 91 directly from the semi-reflecting mirror 134. Thus, it can be seen that the photomultiplier 91 receives two light pulses for each light pulse produced by the light and pulse source 27. The first light pulse is received from the mirror 134, whereas the other light pulse is received some time later from the mirror 136. These two separate pulses can be brought into coincidence individually with the electrical pulses from the light and pulse source 27 by use of the variable delay line 137 and determining the positioning of the variable delay line at the exact points of concidence to provide $T_a$ and $T_b$. Then $T_b - T_a$ gives the time delay $\Delta T$ and this, with the known distance $\Delta L$ which is the distance the light travels from the point at which it enters the mirror 134 to the point at which it is reflected by the mirror 136 gives the velocity of light.

Figure 15:
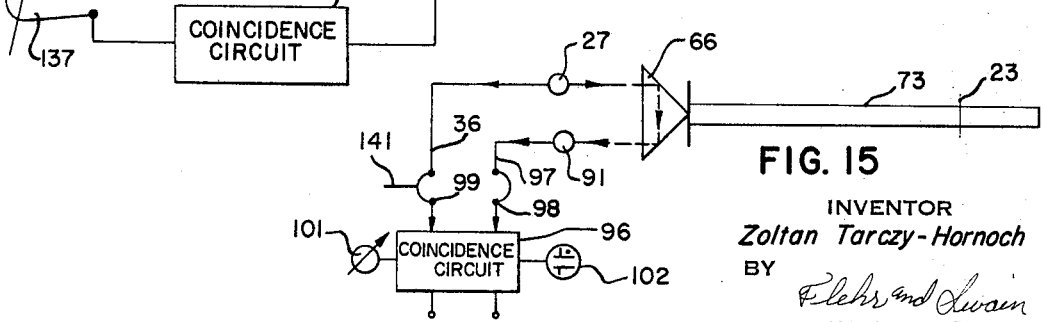

Another alternative embodiment of my apparatus is shown in FIGURE 15 which is very similar to the embodiment shown in FIGURES 1–6 with the exception that the jumper provided in the line 36 is replaced by an open-ended coaxial stub line 141 of a type well known to those skilled in the art. Such stub lines will provide a double pulse for each single pulse supplied to them with the double pulses being separated by a predetermined time which can be represented as $\Delta T$. Thus, with such apparatus, we have two electrical pulses which are a known distance apart and a single light pulse which depends upon the position of the prism 66. Thus, by determining the two points of exact coincidence, two prism positions can be obtained which represent $L_a$ and $L_b$. The difference between $L_b$ and $L_a$ gives $\Delta L$. Having determined $\Delta L$, the speed of light can be determined from the formula $$c = 2\Delta L / \Delta T$$

With such apparatus, it can be seen that the speed of light can be determined with permanently connected apparatus without the necessity of connecting or disconnecting cables as is necessary with the apparatus shown in FIGURES 1–6.

It is apparent from the foregoing that my invention has made it possible to provide a relatively simple apparatus and method for measuring the velocity of light. The apparatus is such that the light is measured within a totally enclosed tube or body so that the measurements can be carried on in a classroom or laboratory in normal light. The apparatus is integrated into one self-contained unit which can be readily carried by one person from one location to another and can be readily put into use without requiring any set-up time. The apparatus is readily adaptable for measuring the speed of light in different media. Generally speaking, my apparatus can be considered to be a method and apparatus for measuring time. It can be readily used for comparing one time interval or delay with another.

I claim:
1. Apparatus for measuring the speed of light in a transparent medium comprising;
   An elongated enclosure which is substantially free from ambient light,
   rapid electrical discharge means disposed within said enclosure for repetitively generating time coincident light pulses and first electrical pulses at a first point within said enclosure,
   means for projecting said light pulses along a path within said enclosure,
   a substantially transparent medium in said enclosure forming at least a part of said light path,
   a reflector located in said path at a second point remote from said source,
   means located at a third point within said enclosure for receiving light pulses reflected from said reflector and for converting said light pulses into second electrical pulses,
   coincidence determining circuit means having a first input path coupled to said discharge means and a second input path coupled to said means for receiving,
   electrical delay means for introducing at will a known and fixed time delay into said first input path to delay said first electrical pulses through said first input path,
   and calibrated means coupled to said reflector for moving said reflector to optically vary the length of the light path and thereby to optically delay said second electrical pulses whereby coincidence between said first and second electrical pulses at said coincidence circuit may be obtained.
2. The apparatus of claim 1 in which said medium is a liquid.
3. The apparatus of claim 1 in which said medium is a solid.

(References on following page)

References Cited

UNITED STATES PATENTS

| | | | |
|---|---|---|---|
| 2,188,970 | 2/1940 | Wilson | 333—29 |
| 2,966,824 | 1/1961 | Granqvist | 88—1 |
| 3,164,725 | 1/1965 | Straub | 88—1 |

OTHER REFERENCES

Bergstrand: "Velocity of Light and Measurement of Distances," Proceedings of the London Conference on Optical Instruments of 1950, pp. 187–200, QC 350 C6.

Gupta: "Spark Counter as a Light Pulser for Phototube Testing," Nuclear Instruments and Methods, vol. 15, February–May 1962, pp. 95–100, TK 9001 N73.

Jenkins and White: Fundamentals of Optics, McGraw-Hill, 1950, pp. 381–395.

Kerns: "Generator of Nanosecond Light Pulses for Phototube Testing," Review of Scientific Instruments, vol. 30, No. 1, January 1959, pp. 31–36, Q 184 R5.

JEWELL H. PEDERSEN, *Primary Examiner.*

DAVID H. RUBIN, *Examiner.*

E. S. BAUER, R. L. WIBERT, *Assistant Examiners.*